US012441494B2

(12) United States Patent
Ho et al.

(10) Patent No.: US 12,441,494 B2
(45) Date of Patent: Oct. 14, 2025

(54) UNMANNED AERIAL VEHICLE (71) Applicant: Qisda Corporation, Taoyuan (TW)

(72) Inventors: Wen-Chung Ho, Taoyuan (TW);
Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 18/671,939

(22) Filed: May 22, 2024

(65) Prior Publication Data
US 2025/0019097 A1 Jan. 16, 2025

(30) Foreign Application Priority Data

Jul. 11, 2023 (TW) .................................. 112125854

(51) Int. Cl.
*B64U 30/293* (2023.01)

(52) U.S. Cl.
CPC .................. *B64U 30/293* (2023.01)

(58) Field of Classification Search
CPC ...... B64U 30/293; B64U 20/50; B64U 10/14; B64U 60/40
See application file for complete search history.

(56) References Cited

U.S. PATENT DOCUMENTS

| | | | | |
|---|---|---|---|---|
| 3,053,480 | A * | 9/1962 | Vanderlip | B64C 27/54 244/17.13 |
| 9,004,396 | B1 * | 4/2015 | Colin | B64U 30/293 244/17.23 |
| 9,409,642 | B1 * | 8/2016 | Pingree | B64U 30/293 |
| 9,527,588 | B1 * | 12/2016 | Rollefstad | B64U 10/13 |
| 9,676,477 | B1 * | 6/2017 | Kimchi | B64C 27/00 |
| 10,124,880 | B1 * | 11/2018 | Ellzey | B64U 40/10 |
| 10,494,094 | B2 * | 12/2019 | Foley | B64U 50/19 |
| 11,235,890 | B1 * | 2/2022 | Dahlstrom | B05B 13/005 |
| 11,702,202 | B1 * | 7/2023 | Anderson | B64C 27/33 244/17.23 |
| 11,827,349 | B1 * | 11/2023 | Manning | B64C 29/0033 |
| 2010/0108801 | A1 * | 5/2010 | Olm | B64U 50/19 244/17.23 |

(Continued)

FOREIGN PATENT DOCUMENTS

| | | |
|---|---|---|
| CN | 204871580 | 12/2015 |
| CN | 206243439 | 6/2017 |

(Continued)

OTHER PUBLICATIONS

"Office Action of Taiwan Counterpart Application", issued on May 12, 2025, p. 1-p. 9.

*Primary Examiner* — Medhat Badawi (57) ABSTRACT

An unmanned aerial vehicle includes a body, a shaft base, an arm, and a clamping assembly. The shaft base is disposed outside the body. The arm is pivotally disposed on the shaft base and is movably close to the body or unfolded from the body. The clamping assembly is movably and pivotally disposed on the shaft base and surrounds a periphery of the shaft base. When the arm is close to the body, the arm is limited between the body and the clamping assembly. During an unfolding process of the arm, the clamping assembly is pushed by the arm to be pivotally rotated on the shaft base. When the arm is unfolded from the body, the clamping assembly clamps the arm along a radial direction of the arm by an elastic force.

8 Claims, 11 Drawing Sheets

(56) References Cited

U.S. PATENT DOCUMENTS

| | | | | |
|---|---|---|---|---|
| 2010/0198514 A1* | 8/2010 | Miralles | G08G 5/55 | 701/302 |
| 2011/0139923 A1* | 6/2011 | Papanikolopoulos | B64U 10/80 | 244/2 |
| 2012/0083945 A1* | 4/2012 | Oakley | G05D 1/0202 | 701/2 |
| 2012/0211589 A1* | 8/2012 | Uzman | G05D 1/0038 | 244/3.13 |
| 2013/0146718 A1* | 6/2013 | Tao | B64C 13/34 | 244/90 R |
| 2014/0131510 A1* | 5/2014 | Wang | B64D 31/14 | 244/17.23 |
| 2015/0203201 A1* | 7/2015 | Tao | B64C 9/08 | 244/90 R |
| 2015/0210388 A1* | 7/2015 | Criado | B64U 20/87 | 244/6 |
| 2015/0298799 A1* | 10/2015 | Bertrand | B64U 10/14 | 244/17.23 |
| 2015/0377405 A1* | 12/2015 | Down | G05D 1/104 | 244/76 R |
| 2016/0122012 A1* | 5/2016 | Choo | B64U 10/13 | 244/17.23 |
| 2016/0122016 A1* | 5/2016 | Mintchev | B64U 30/293 | 244/17.23 |
| 2016/0130000 A1* | 5/2016 | Rimanelli | B64U 20/50 | 244/2 |
| 2016/0144957 A1* | 5/2016 | Claridge | B64U 50/30 | 244/6 |
| 2016/0159471 A1* | 6/2016 | Chan | B64D 27/40 | 244/39 |
| 2016/0176520 A1* | 6/2016 | Goldstein | B64U 30/293 | 244/17.23 |
| 2016/0185445 A1* | 6/2016 | Miralles | B64C 9/18 | 244/13 |
| 2016/0200436 A1* | 7/2016 | North | B64C 5/02 | 244/7 R |
| 2016/0340028 A1* | 11/2016 | Datta | B64U 30/293 | |
| 2017/0006340 A1* | 1/2017 | Enke | H04N 23/60 | |
| 2017/0029106 A1* | 2/2017 | Chang | B64U 20/70 | |
| 2017/0036771 A1* | 2/2017 | Woodman | B64C 25/10 | |
| 2017/0158328 A1* | 6/2017 | Foley | B64U 30/296 | |
| 2017/0197703 A1* | 7/2017 | Wood | B64U 10/16 | |
| 2018/0035606 A1* | 2/2018 | Burdoucci | A01D 34/008 | |
| 2018/0105254 A1* | 4/2018 | Tian | B64C 27/50 | |
| 2018/0134369 A1* | 5/2018 | Tian | B64U 30/293 | |
| 2018/0304984 A1* | 10/2018 | Zheng | H04N 7/185 | |
| 2018/0312253 A1* | 11/2018 | Zhao | G05D 1/106 | |
| 2018/0327092 A1* | 11/2018 | Deng | B64C 39/024 | |
| 2018/0335372 A1* | 11/2018 | Orol | G01N 1/08 | |
| 2019/0071178 A1* | 3/2019 | Caubel | B64C 27/50 | |
| 2019/0092457 A1* | 3/2019 | Ohta | B64U 30/293 | |
| 2019/0185169 A1* | 6/2019 | Xu | B64D 47/00 | |
| 2019/0225335 A1* | 7/2019 | Zhang | B32B 1/00 | |
| 2019/0344877 A1* | 11/2019 | Gilliland | B64D 35/08 | |
| 2019/0367169 A1* | 12/2019 | O'Leary | F41A 27/08 | |
| 2019/0369057 A1* | 12/2019 | Mattar | G01N 29/265 | |
| 2019/0389575 A1* | 12/2019 | Kirkbride | B64U 50/19 | |
| 2020/0079495 A1* | 3/2020 | Yang | B64C 29/0033 | |
| 2020/0108928 A1* | 4/2020 | Nwosu | B64U 50/11 | |
| 2020/0108930 A1* | 4/2020 | Foley | B64U 80/00 | |
| 2020/0164957 A1* | 5/2020 | Xu | B64D 45/00 | |
| 2020/0269965 A1* | 8/2020 | Sugaki | F16M 7/00 | |
| 2020/0277040 A1* | 9/2020 | Liu | B64U 80/70 | |
| 2020/0307755 A1* | 10/2020 | Zhang | B64U 30/293 | |
| 2020/0307826 A1* | 10/2020 | Zhang | F16M 11/2071 | |
| 2020/0317318 A1* | 10/2020 | Wu | B64U 50/19 | |
| 2021/0039784 A1* | 2/2021 | Wu | B64D 1/18 | |
| 2021/0053679 A1* | 2/2021 | Johannesson | B64U 20/80 | |
| 2021/0061458 A1* | 3/2021 | Zeng | B60F 5/02 | |
| 2021/0107636 A1* | 4/2021 | Seung | B64U 30/293 | |
| 2021/0125503 A1* | 4/2021 | Henry | G05D 1/606 | |
| 2021/0129979 A1* | 5/2021 | Wang | B64U 30/299 | |
| 2021/0188420 A1* | 6/2021 | Louie | B64U 30/293 | |
| 2021/0188432 A1* | 6/2021 | Yagoub | B64U 10/13 | |
| 2021/0214068 A1* | 7/2021 | Bry | B64D 47/08 | |
| 2021/0237897 A1* | 8/2021 | Gury | B64U 20/70 | |
| 2021/0237898 A1* | 8/2021 | Gury | B64U 20/80 | |
| 2021/0239434 A1* | 8/2021 | Gury | G05D 1/12 | |
| 2021/0240207 A1* | 8/2021 | Gury | B64D 7/00 | |
| 2021/0263515 A1* | 8/2021 | Henry | G05D 1/0088 | |
| 2021/0325904 A1* | 10/2021 | Chaumette | G05D 1/02 | |
| 2022/0289380 A1* | 9/2022 | Rakshit | B64D 1/00 | |
| 2022/0306272 A1* | 9/2022 | Morris | B64U 30/293 | |
| 2022/0340259 A1* | 10/2022 | Yoon | B64C 11/28 | |
| 2022/0388653 A1* | 12/2022 | Kuperman | B64U 30/293 | |
| 2022/0411047 A1* | 12/2022 | Mihai | B64C 25/20 | |
| 2023/0071482 A1* | 3/2023 | Suppes | B64U 30/297 | |
| 2023/0118521 A1* | 4/2023 | Woodman | B64U 30/293 | 244/55 |
| 2023/0234702 A1* | 7/2023 | Watterson, III | B64C 27/48 | 244/17.23 |
| 2023/0234706 A1* | 7/2023 | Arlton | B64U 20/80 | 244/17.23 |
| 2023/0249817 A1* | 8/2023 | Groninga | B64D 31/14 | |
| 2023/0294828 A1* | 9/2023 | Arlton | B64C 39/024 | 244/17.23 |
| 2023/0312143 A1* | 10/2023 | Wu | B64C 27/57 | 244/17.13 |
| 2023/0356836 A1* | 11/2023 | Von Bertouch | B64U 30/293 | |
| 2024/0083575 A1* | 3/2024 | Ma | B64U 60/60 | |
| 2024/0132235 A1* | 4/2024 | Suzuki | B64C 27/33 | |
| 2024/0132237 A1* | 4/2024 | Xiao | B64U 10/25 | |
| 2024/0262499 A1* | 8/2024 | Kowald | B64C 39/026 | |
| 2024/0400238 A1* | 12/2024 | Luong | B64U 20/50 | |
| 2025/0019097 A1* | 1/2025 | Ho | B64U 30/293 | |
| 2025/0042544 A1* | 2/2025 | Manning | B64D 27/40 | |
| 2025/0083840 A1* | 3/2025 | Collings | B64U 10/14 | |

FOREIGN PATENT DOCUMENTS

| | | |
|---|---|---|
| CN | 214608062 | 11/2021 |
| CN | 113795424 | 12/2021 |
| CN | 114104259 | 3/2022 |
| CN | 115180113 | 10/2022 |
| CN | 115367108 | 11/2022 |

* cited by examiner

UNMANNED AERIAL VEHICLE

CROSS-REFERENCE TO RELATED APPLICATION

This application claims the priority benefit of Taiwan application serial no. 112125854, filed on Jul. 11, 2023. The entirety of the above-mentioned patent application is hereby incorporated by reference herein and made a part of this specification.

BACKGROUND

Technical Field

The invention relates to an unmanned aerial vehicle, and in particular to an unmanned aerial vehicle for easy carrying.

Description of Related Art

In recent years, the development of unmanned aerial vehicles has been in the ascendant, and the applications of unmanned aerial vehicles have been widely used in fields such as military, transportation, monitoring, and aerial photography. Thus, how to make the unmanned aerial vehicle easy to carry and an arm provide good stability is the main issue for research in this field.

SUMMARY

The invention provides an unmanned aerial vehicle whose arm may be folded so as to easy carry and may be unfolded and well fixed so as to provide a good flight effect.

The unmanned aerial vehicle of the invention includes a body, a shaft base, an arm, and a clamping assembly. The shaft base is disposed outside the body. The arm is pivotally disposed on the shaft base and may be movably close to the body or unfolded from the body. The clamping assembly is movably and pivotally disposed on the shaft base and surrounds a periphery of the shaft base. When the arm is close to the body, the arm is limited between the body and the clamping assembly. During an unfolding process of the arm, the clamping assembly is pushed by the arm to be pivotally rotated on the shaft base. When the arm is unfolded from the body, the clamping assembly clamps the arm along a radial direction of the arm by an elastic force.

In an embodiment of the invention, the clamping assembly includes a torsion spring and a clamping member. The torsion spring is disposed between the clamping member and the shaft base and provides the elastic force.

In an embodiment of the invention, the clamping member includes a hook part and a limiting part integrally formed and arranged in a non-linear manner. The hook part is located between the limiting part and the torsion spring. When the arm is close to the body, the arm is limited between the body and the limiting part. When the arm is unfolded from the body, the hook part clamps the arm along the radial direction of the arm by the elastic force.

In an embodiment of the invention, the hook part includes an inner surface facing the arm. The inner surface is in an inverted U shape. When the arm is unfolded from the body, a part of the arm is located in the inverted U shape.

In an embodiment of the invention, the hook part includes an outer surface opposite to the inner surface and a reinforcing outer rib protruding from the outer surface.

In an embodiment of the invention, the limiting part includes a pushing section away from the hook part. The pushing section has an arc surface or an inclined surface. During the unfolding process of the arm, the pushing section is pushed by the arm to be pivotally rotated on the shaft base, so that the arm passes through the pushing section.

In an embodiment of the invention, the limiting part includes a flat extension section connected between the pushing section and the hook part. The shaft base includes a lower shaft base. The pushing section is formed by the flat extension section extending in a direction away from the lower shaft base.

In an embodiment of the invention, the shaft base includes an upper shaft base and a lower shaft base. The arm is pivotably sandwiched between the upper shaft base and the lower shaft base by a shaft part. A clamping member is movably and pivotally disposed on the upper shaft base or the lower shaft base and protrudes outside the shaft base.

In an embodiment of the invention, each of the upper shaft base and the lower shaft base includes a plurality of internal positioning ribs. At least part of the internal positioning ribs are arranged in a radial manner and are disposed annularly outside the shaft part, and the internal positioning ribs abut against an outer surface of the shaft part.

In an embodiment of the invention, the lower shaft base includes a fixed shaft and a positioning part. The clamping assembly includes a torsion spring and the clamping member. The clamping member includes a hook part and a pressing part integrally formed. The clamping member and the torsion spring are both pivotally disposed on the fixed shaft. The fixed shaft is disposed close to an area between the hook part and the pressing part. Two ends of the torsion spring abut the pressing part and the positioning part and provide the elastic force.

Based on the above, the arm of the UAV of the invention is pivotally disposed on the shaft base and may be movably close to the body or unfolded from the body. The clamping assembly is movably and pivotally disposed on the shaft base and surrounds the periphery of the shaft base. When the arm is close to the body, the arm is limited between the body and the clamping assembly by the clamping assembly to reduce an overall volume and avoid unnecessary collisions, so that the UAV is easy to carry and improves reliability. During the unfolding process of the arm, the clamping assembly is pushed by the arm to be pivotally rotated on the shaft base. When the arm is unfolded from the body, the clamping assembly clamps the arm along the radial direction of the arm by the elastic force, so that the unfolded arm may be well fixed at a specific position of the shaft base, which improves a flight safety of the UAV and provides the good flight effect.

DESCRIPTION OF THE EMBODIMENTS

Figure 1A:
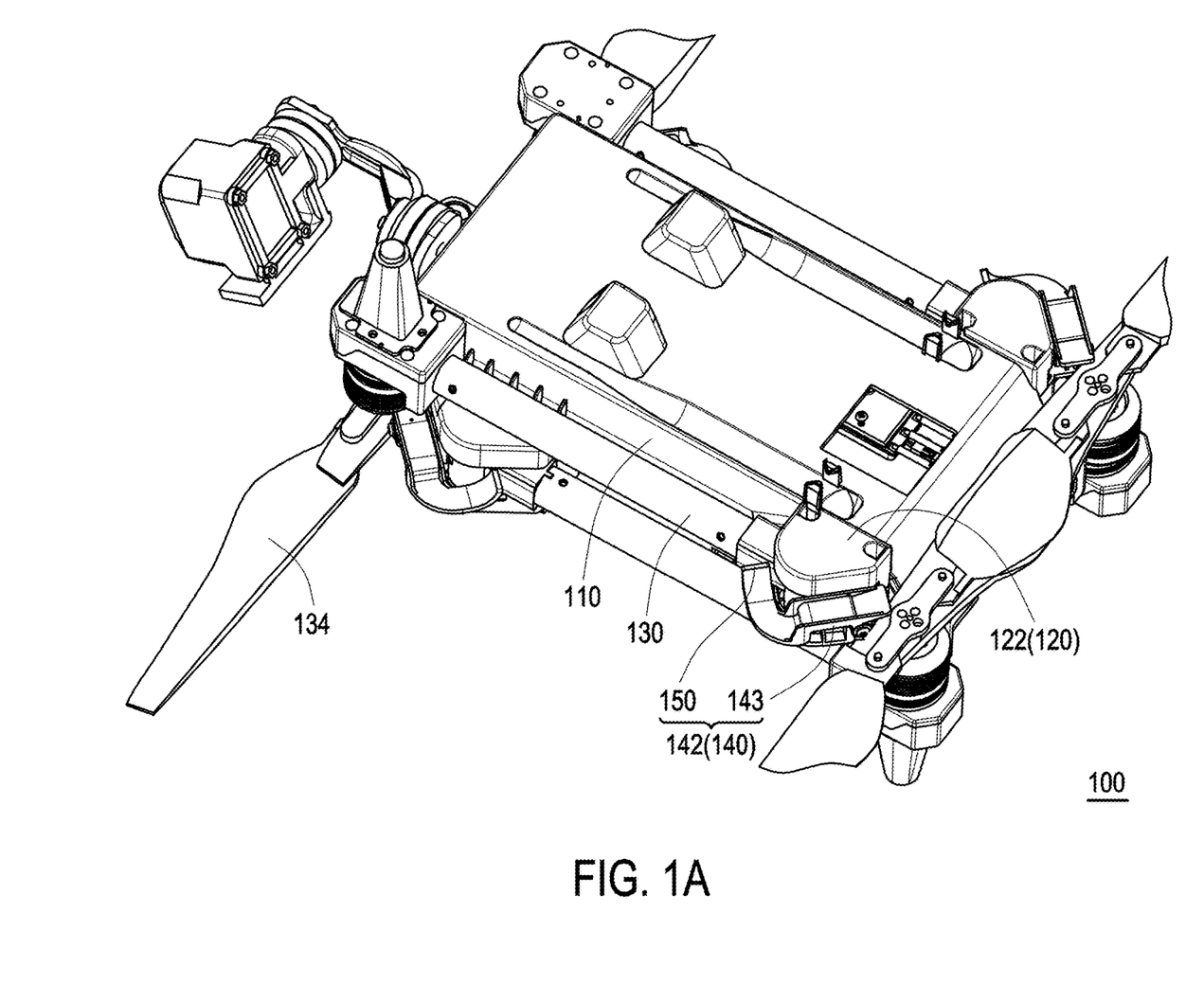
FIG. 1A is a partial schematic three-dimensional view of an unmanned aerial vehicle with an arm close to a body according to an embodiment of the invention.
Figure 1B:
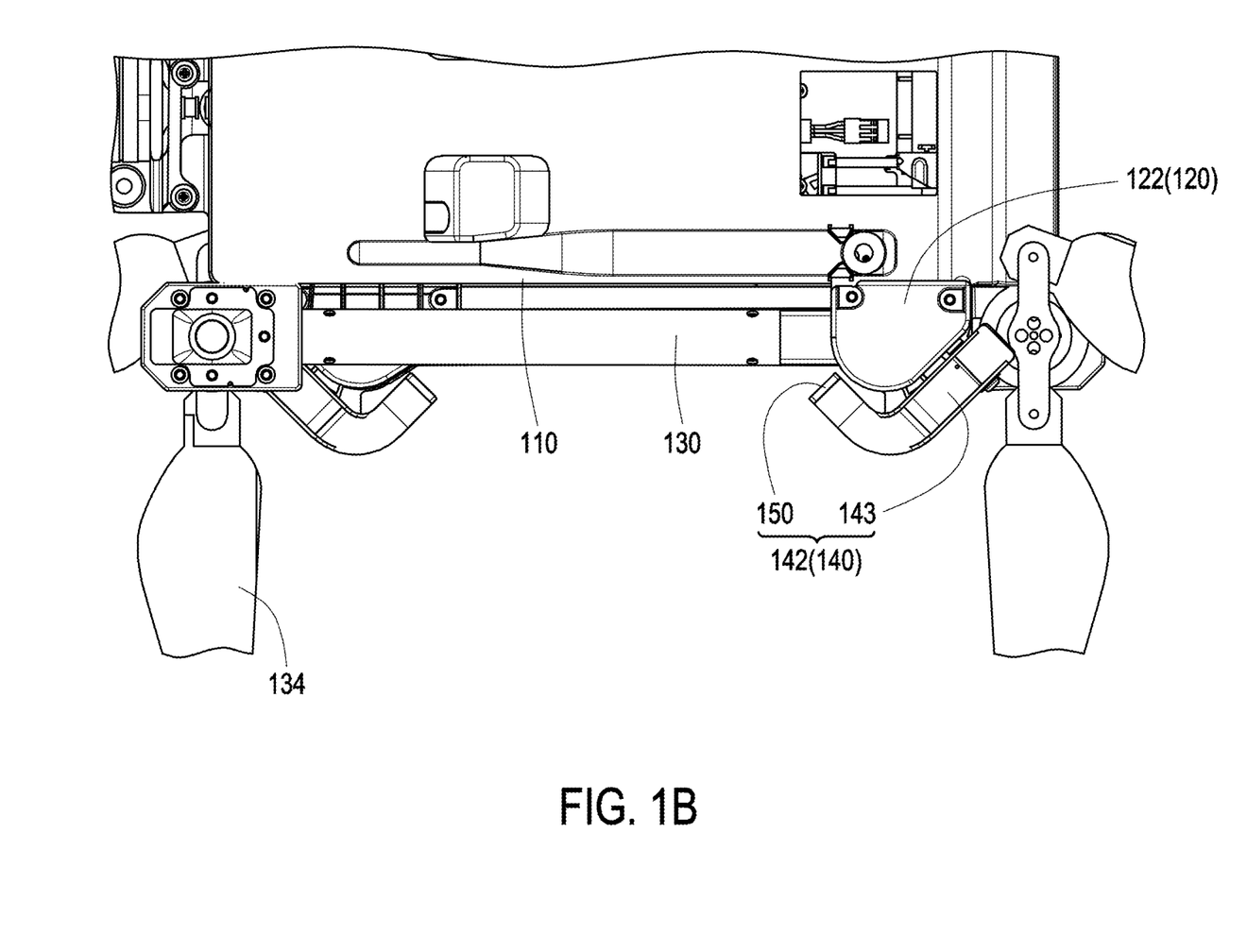
FIG. 1B is a partial schematic top view of FIG. 1A.
Figure 2:
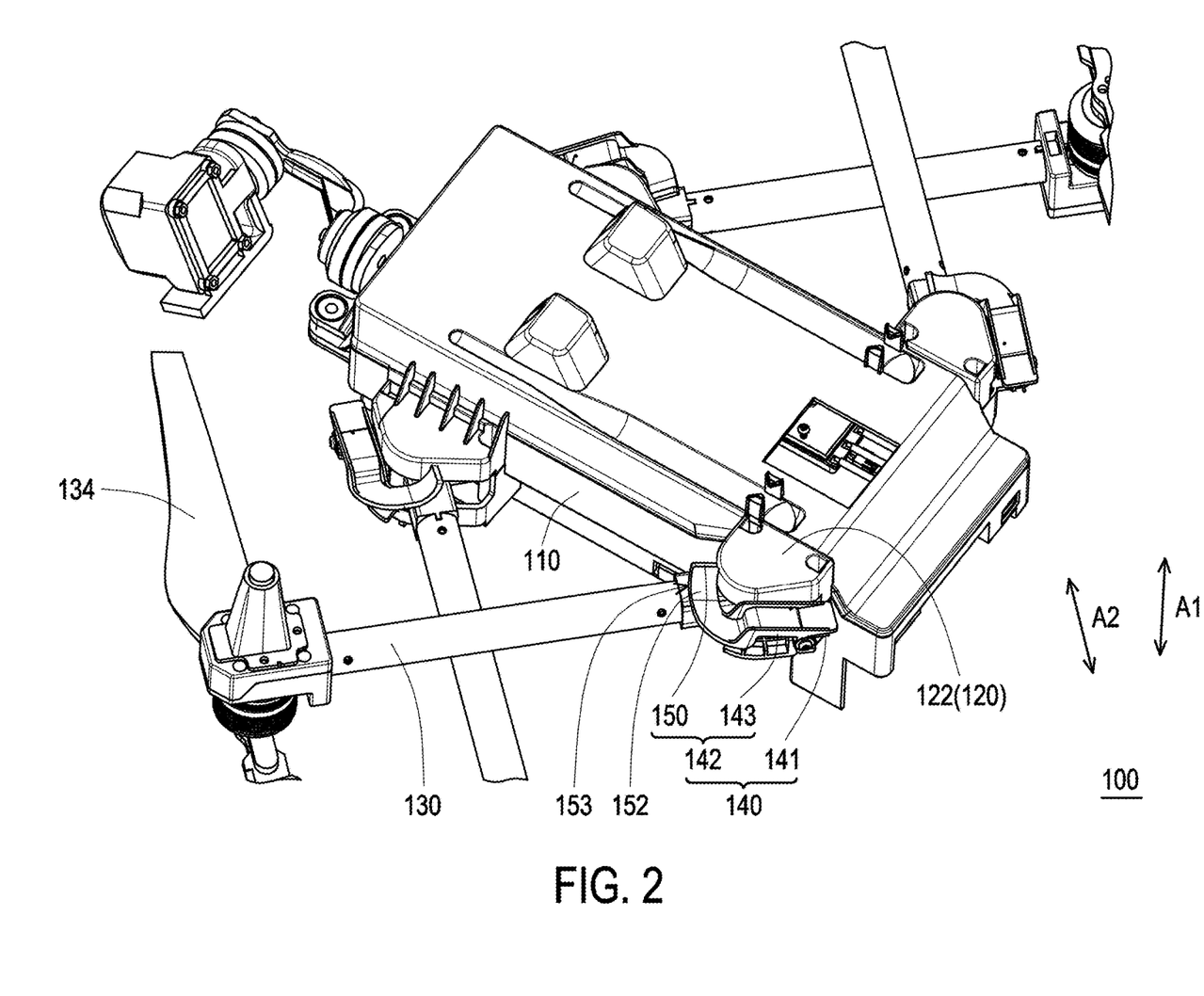
FIG. 2 is a schematic three-dimensional view of an unfolding process of the arm of the UAV in FIG. 1A.
Figure 3:
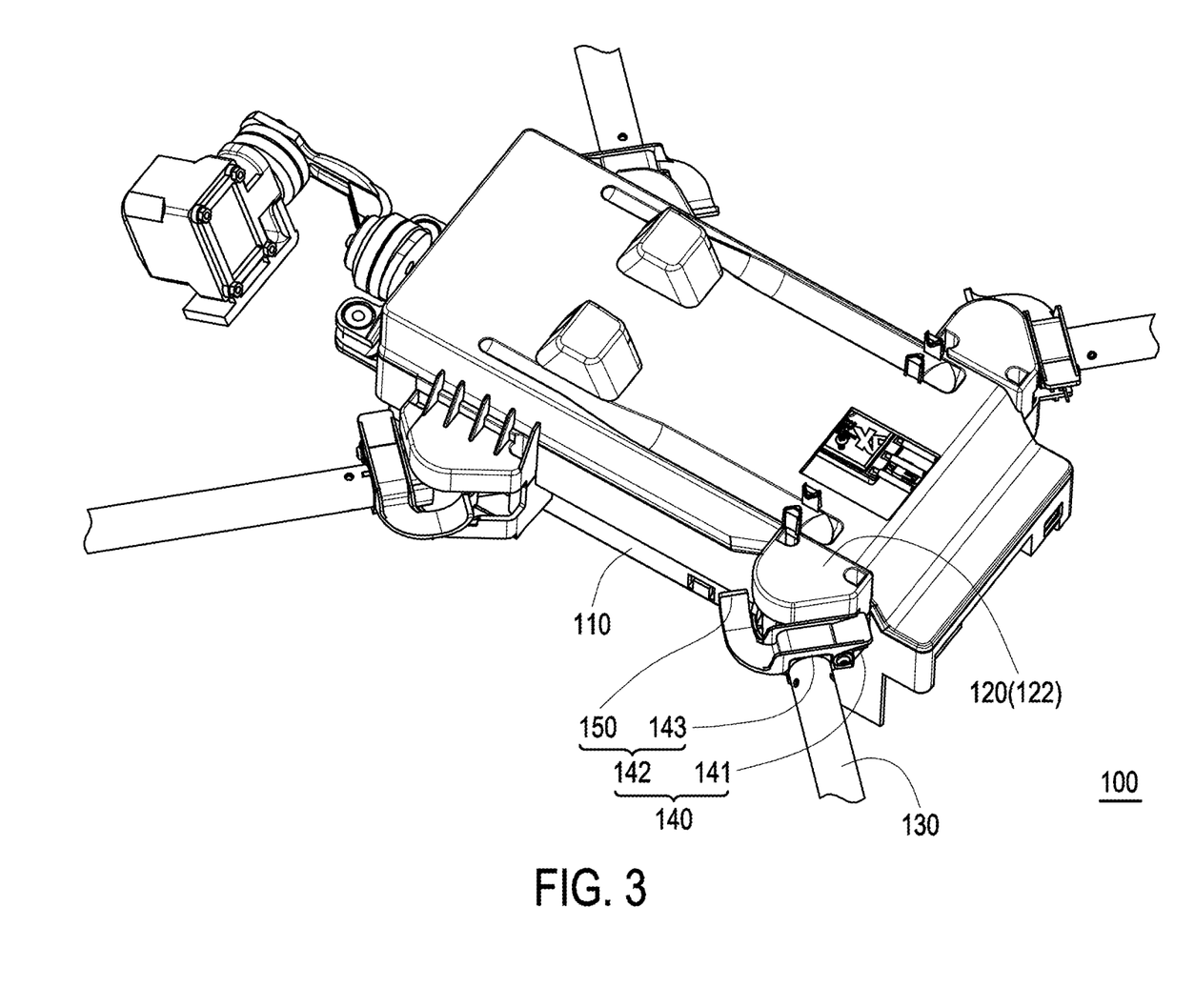
FIG. 3 is a schematic three-dimensional view of an unfolding arm of the UAV in FIG. 1A.

FIG. 1A is a partial schematic three-dimensional view of an unmanned aerial vehicle with an arm close to a body according to an embodiment of the invention. FIG. 1B is a partial schematic top view of FIG. 1A. FIG. 2 is a schematic three-dimensional view of an unfolding process of the arm of the UAV in FIG. 1A. FIG. 3 is a schematic three-dimensional view of an unfolding arm of the UAV in FIG. 1A.

Referring to FIG. 1A to FIG. 3, a UAV 100 of this embodiment includes a body 110, a shaft base 120, an arm 130, and a clamping assembly 140. In this embodiment, a shape of the body 110 is close to a quadrilateral. The shaft base 120, the arm 130, and the clamping assembly 140 have, for example, four groups. The four groups of the shaft base 120, the arm 130, and the clamping assembly 140 are respectively disposed on four corners of the body 110. Of course, a shape of the body 110 and numbers of groups of the shaft base 120, the arm 130, and the clamping assembly 140 are not limited thereto.

In this embodiment, the shaft base 120 is disposed outside the body 110. The arm 130 is pivotally disposed on the shaft base 120 along a first axis A1 (see FIG. 2) and may be movably close to the body 110 (see FIG. 1A and FIG. 1B) or unfolded from the body 110 (see FIG. 2 and FIG. 3).

The clamping assembly 140 is movably and pivotally disposed on the shaft base 120 and surrounds a periphery of the shaft base 120. In this embodiment, the clamping assembly 140 in a lower right corner of a figure is taken as an example. The clamping assembly 140 is pivotally disposed on the shaft base 120 along a second axis A2 (see FIG. 2) perpendicular to the first axis A1 and may be flipped relative to the shaft base 120.

In this embodiment, as shown in FIG. 1A and FIG. 1B, when the arm 130 is close to the body 110, the arm 130 is limited between the body 110 and the clamping assembly 140 so as to reduce an overall volume, so that the UAV 100 is easy to carry.

As shown in FIG. 2, during a process of the arm 130 rotating along the first axis A1 and unfolding from relative to the body 110, the clamping assembly 140 is pushed by the arm 130 to be pivotally rotated relative to the shaft base 120 along the second axis A2.

As shown in FIG. 3, when the arm 130 is unfolded from the body 110, the clamping assembly 140 clamps the arm 130 along a radial direction of the arm 130 by an elastic force so as to fix the arm 130. Therefore, the unfolded arm 130 may be well fixed and provide a good flight effect.

A specific structure of the UAV 100 of this embodiment are described below.

Figure 4:
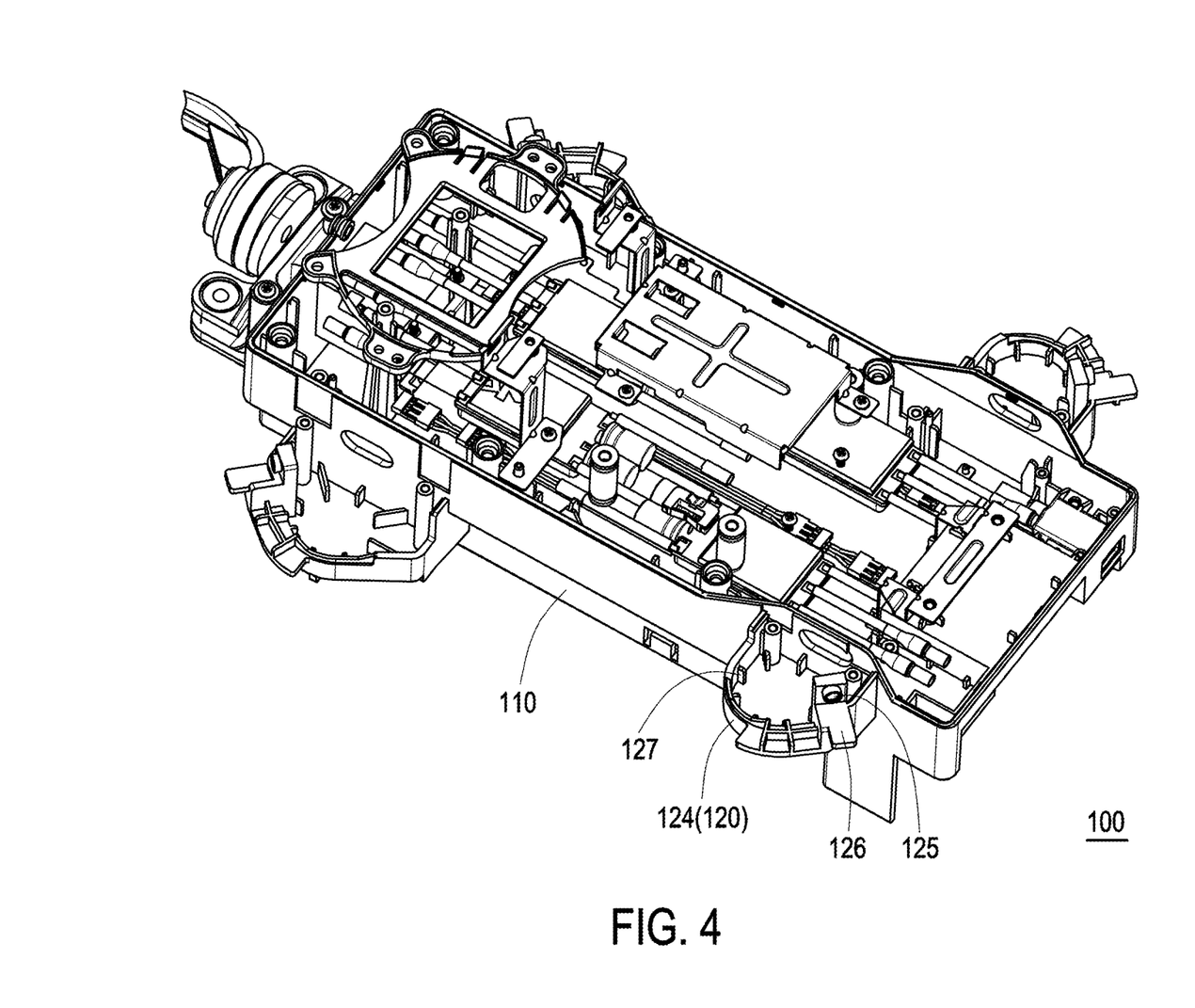
FIG. 4 is a schematic view of the body and a lower shaft base of the UAV in FIG. 1A.
Figure 5:
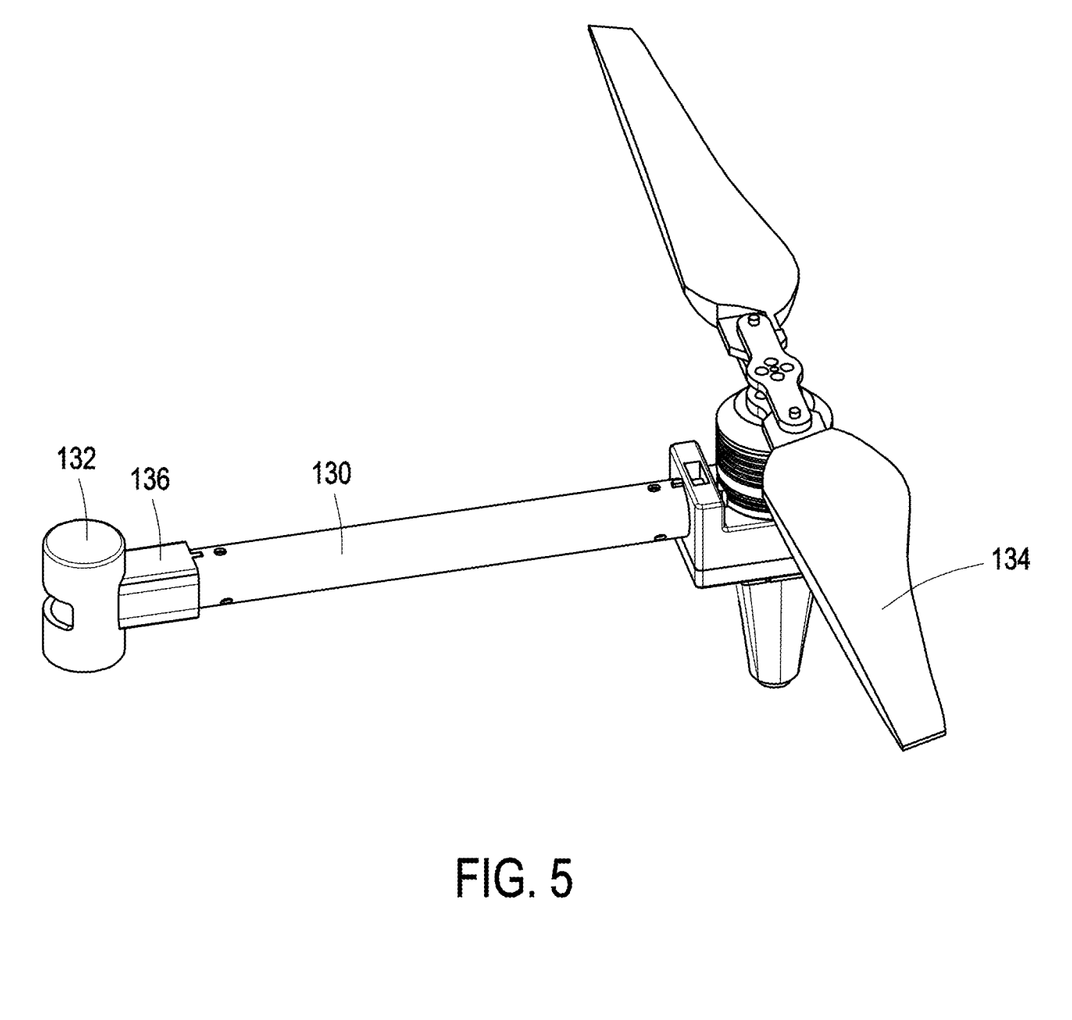
FIG. 5 is a schematic view of the arm of the UAV in FIG. 1A.
Figure 6:
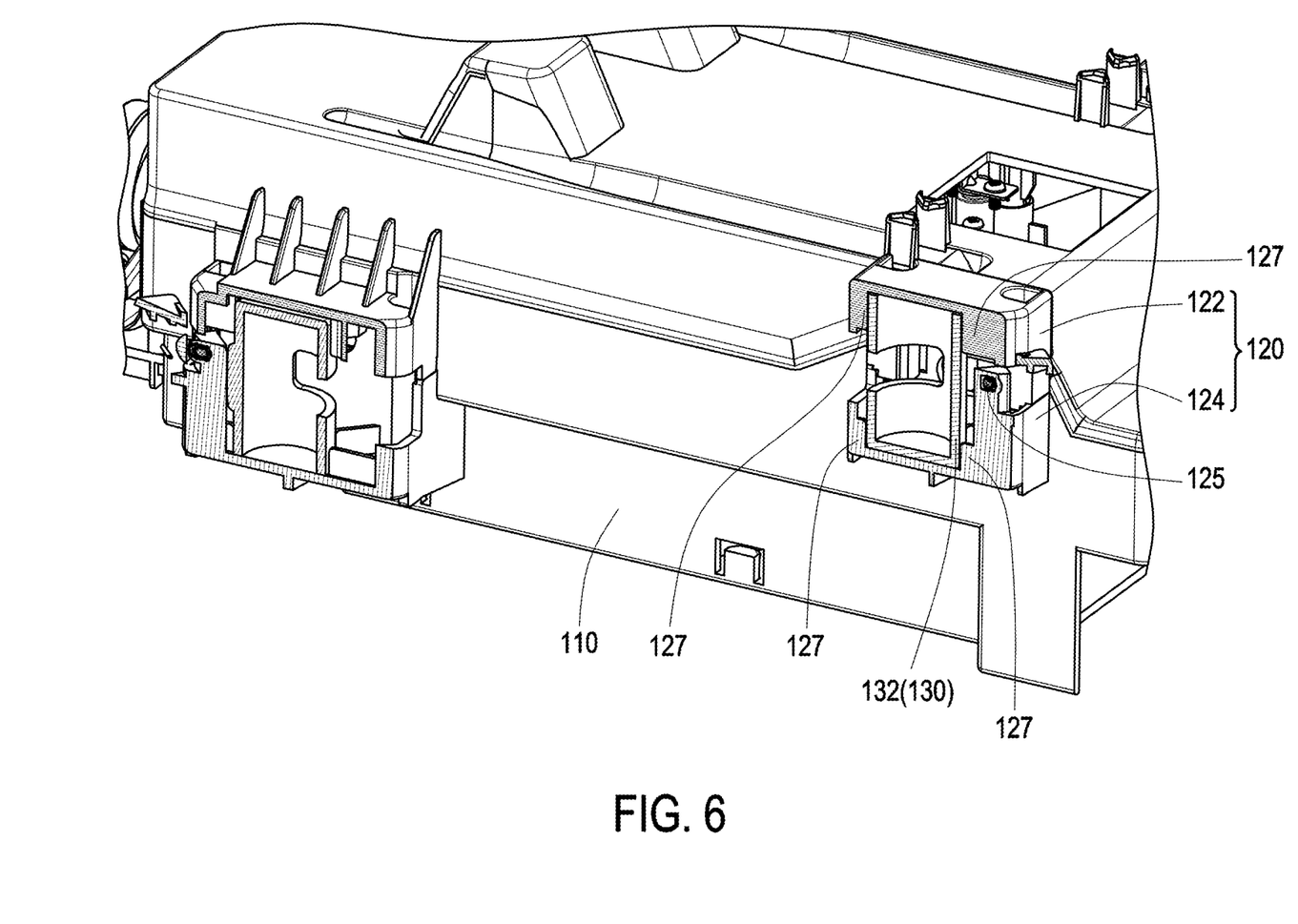
FIG. 6 is a partial schematic cross-sectional view of the UAV in FIG. 1A at the shaft base.

FIG. 4 is a schematic view of the body and a lower shaft base of the UAV in FIG. 1A. FIG. 5 is a schematic view of the arm of the UAV in FIG. 1A. FIG. 6 is a partial schematic cross-sectional view of the UAV in FIG. 1A at the shaft base.

Referring to FIG. 4 to FIG. 6, the shaft base 120 of this embodiment includes an upper shaft base 122 (see FIG. 6) and a lower shaft base 124. As shown in FIG. 6, the arm 130 (see FIG. 5) is pivotably sandwiched between the upper shaft base 122 and the lower shaft base 124 by a shaft part 132. A blade 134 is disposed on an end of the arm 130 away from the shaft part 132.

As may be seen in FIG. 4 and FIG. 6, each of the upper shaft base 122 and the lower shaft base 124 includes a plurality of internal positioning ribs 127. At least part of the internal positioning ribs 127 as shown in FIG. 4 are arranged in a radial manner and are annularly disposed outside the shaft part 132, and these positioning inner ribs 127 abut against an outer surface 145 of the shaft part 132. These internal positioning ribs 127 may serve as shaft bearings, so that the shaft part 132 is positioned and rotates smoothly to reduce friction between the shaft part 132 and the shaft base 120.

Figure 7A:
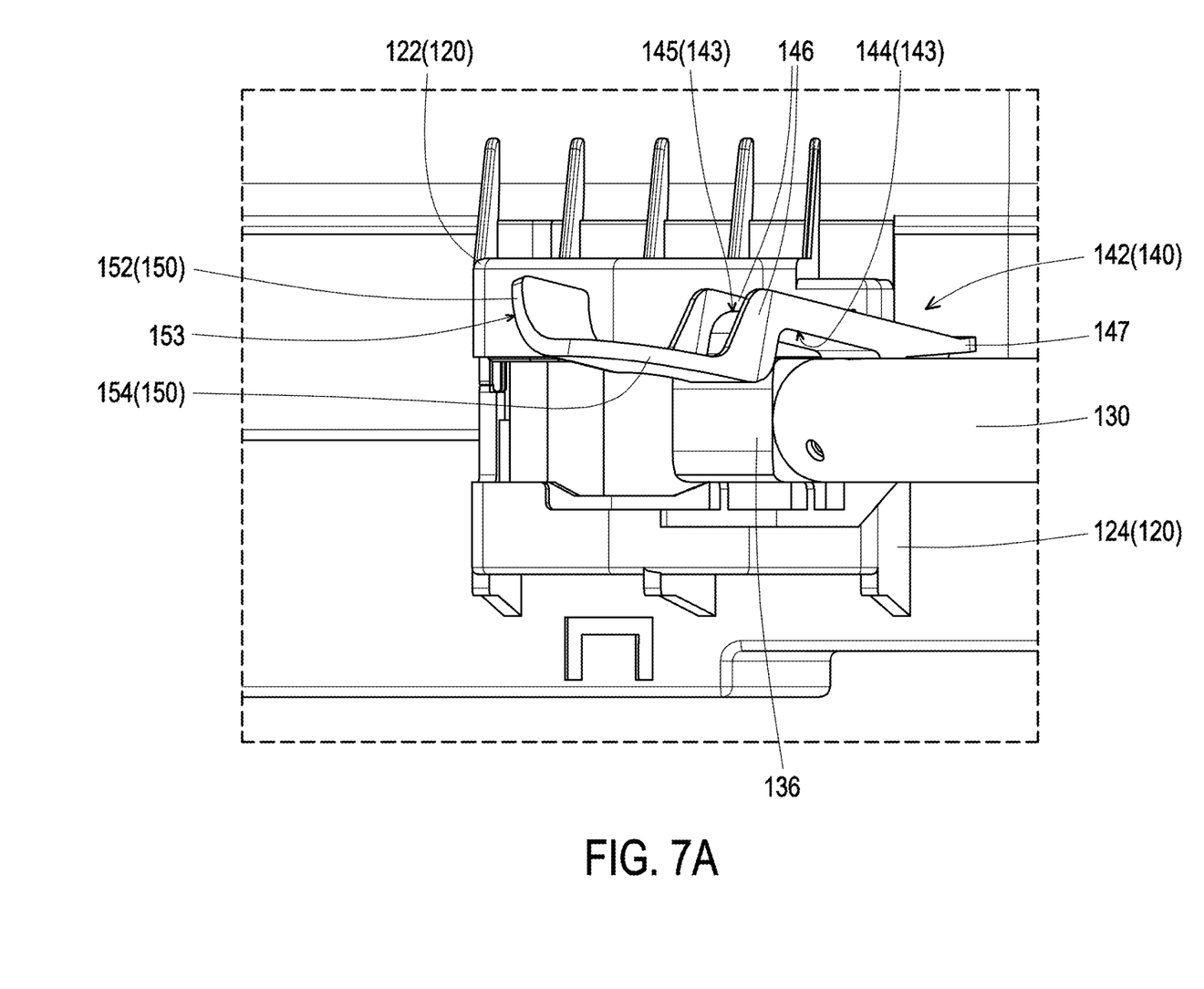
FIG. 7A is a schematic three-dimensional view of a clamping member of the UAV in FIG. 1A before clamping the arm.
Figure 7B:
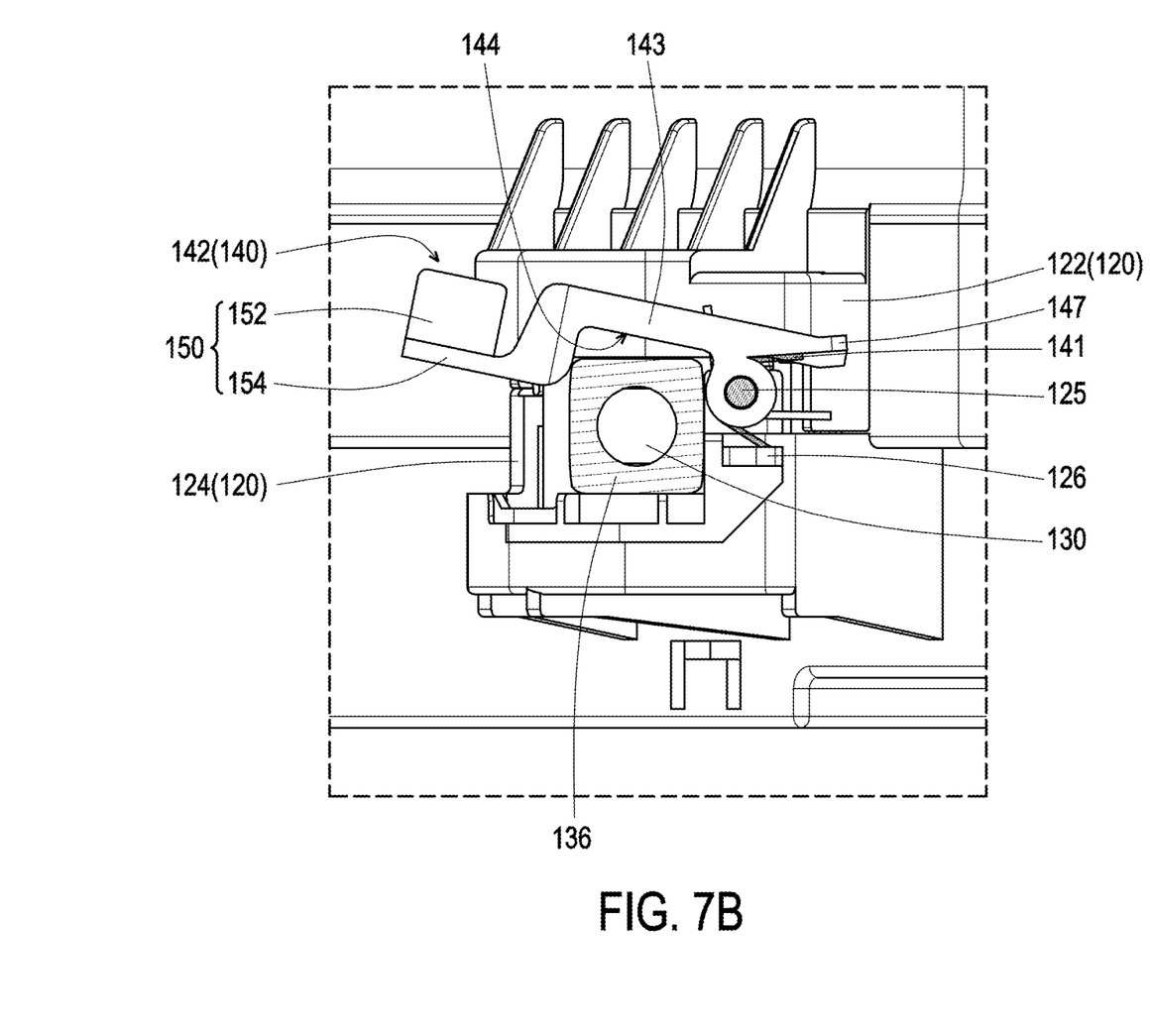
FIG. 7B is a schematic cross-sectional view of FIG. 7A.

FIG. 7A is a schematic three-dimensional view of a clamping member of the UAV in FIG. 1A before clamping the arm. FIG. 7B is a schematic cross-sectional view of FIG. 7A. Referring to FIG. 3, FIG. 7A, and FIG. 7B, the clamping assembly 140 includes a torsion spring 141 (see FIG. 7B) and a clamping member 142. As shown in FIG. 7B, the torsion spring 141 is disposed between the clamping member 142 and the shaft base 120 and provides the elastic force. In this embodiment, the clamping member 142 is movably and pivotally disposed on the lower shaft base 124 and protrudes outside the shaft base 120. In other embodiments, the clamping member 142 is movably and pivotally disposed on the upper shaft base 122. A relationship between the clamping member 142 and the shaft base 120 is not limited thereto.

More specifically, in view of FIG. 7B, the lower shaft base 124 includes a fixed shaft 125 and a positioning part 126. The clamping member 142 includes a hook part 143, a limiting part 150, and a pressing part 147 integrally formed. The hook part 143 is located between the limiting part 150 and the pressing part 147. A portion of the clamping member 142 between the hook part 143 and the pressing part 147 and the torsion spring 141 are both pivotally disposed on the fixed shaft 125. Therefore, the fixed shaft 125 is located close to between the hook part 143 and the pressing part 147. In addition, two ends of the torsion spring 141 abut the pressing part 147 and the positioning part 126 and provide the elastic force.

It may be seen from the above configuration that the clamping member 142 may rotate about the fixed shaft 125 as a shaft center when receiving force, so that the torsion spring 141 is deformed. At this time, the torsion spring 141 accumulates the elastic force. When the force on the clamping member 142 disappears, the elastic force may be released, so that the clamping member 142 returns to its original position.

In this embodiment, the hook part 143 includes an inner surface 144 facing the arm 130, an outer surface 145 opposite to the inner surface 144, and a reinforcing outer rib 146 protruding from the outer surface 145. The inner surface 144 of the hook part 143 is in an inverted U shape and is configured to accommodate and position the arm 130. The reinforcing outer ribs 146 are configured to increase a structural strength of the hook part 143.

In addition, in this embodiment, the hook part 143 and the limiting part 150 are arranged in a non-linear manner. The limiting part 150 includes a pushing section 152 away from the hook part 143. The pushing section 152 has an arc surface 153. In other embodiments, the pushing section 152 may also have an inclined surface, and a form of the pushing section 152 is not limited thereto. In addition, the limiting part 150 includes a flat extension section 154 connected between the pushing section 152 and the hook part 143. In this embodiment, the pushing section 152 is formed by the flat extension section 154 extending in a direction away from the lower shaft base 124.

Returning to FIG. 1B, in this embodiment, when the arm 130 is close to the body 110, the arm 130 is limited between the body 110 and the limiting part 150 of the clamping member 142.

Referring to FIG. 2 and FIG. 7A, during the unfolding process of the arm 130, the arc surface 153 of the pushing section 152 of the limiting part 150 is pushed by the arm 130 to be pivotally rotated on the shaft base 120 relative to the arc surface 153, and the pushing section 152 moves up, so that the arm 130 passes through the pushing section 152, and then the arm 130 passes through the flat extension section 154. At this time, the torsion spring 141 accumulates the elastic force.

Figure 8A:
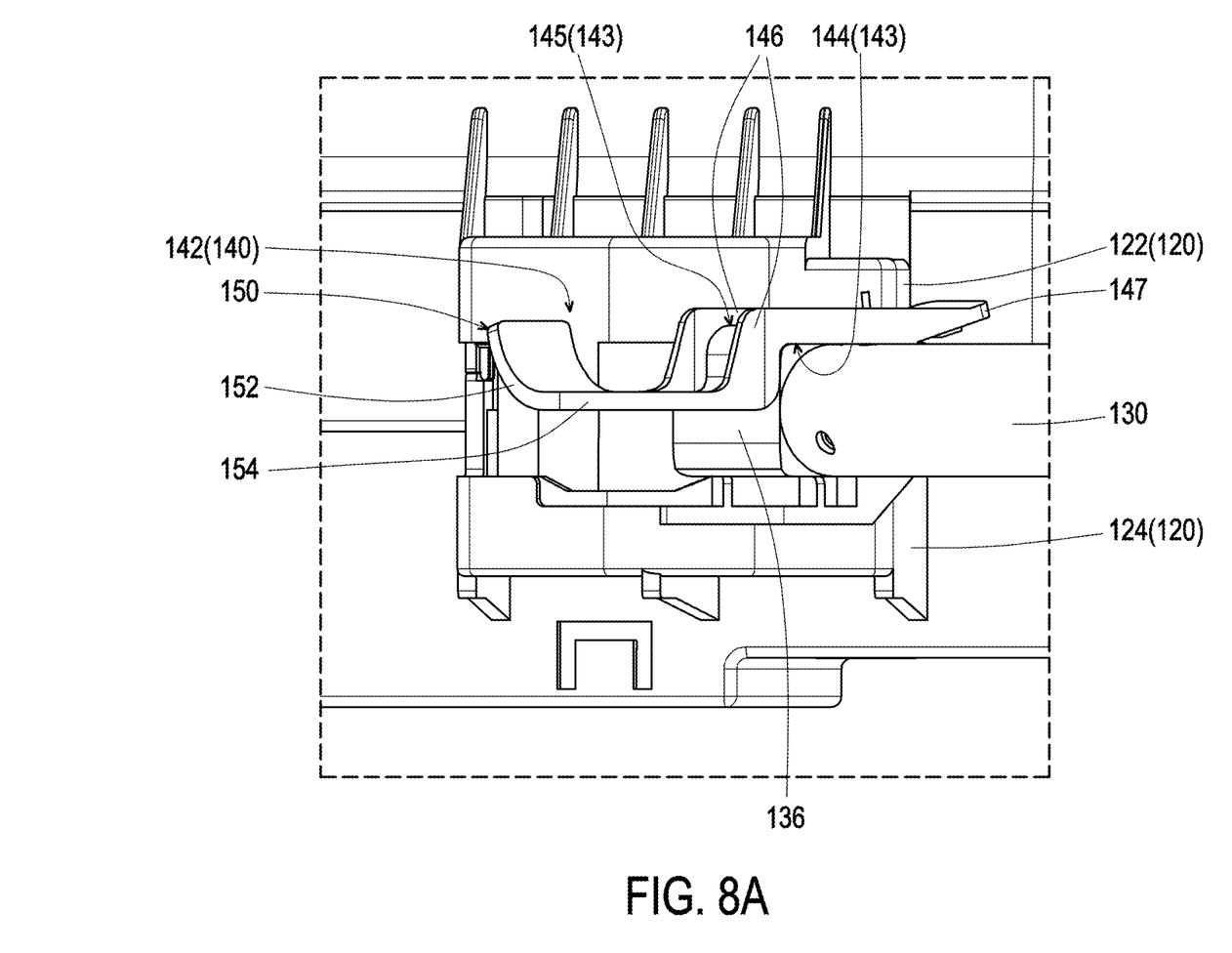
FIG. 8A is a schematic three-dimensional view of the clamping member of the UAV in FIG. 1A clamping the arm.
Figure 8B:
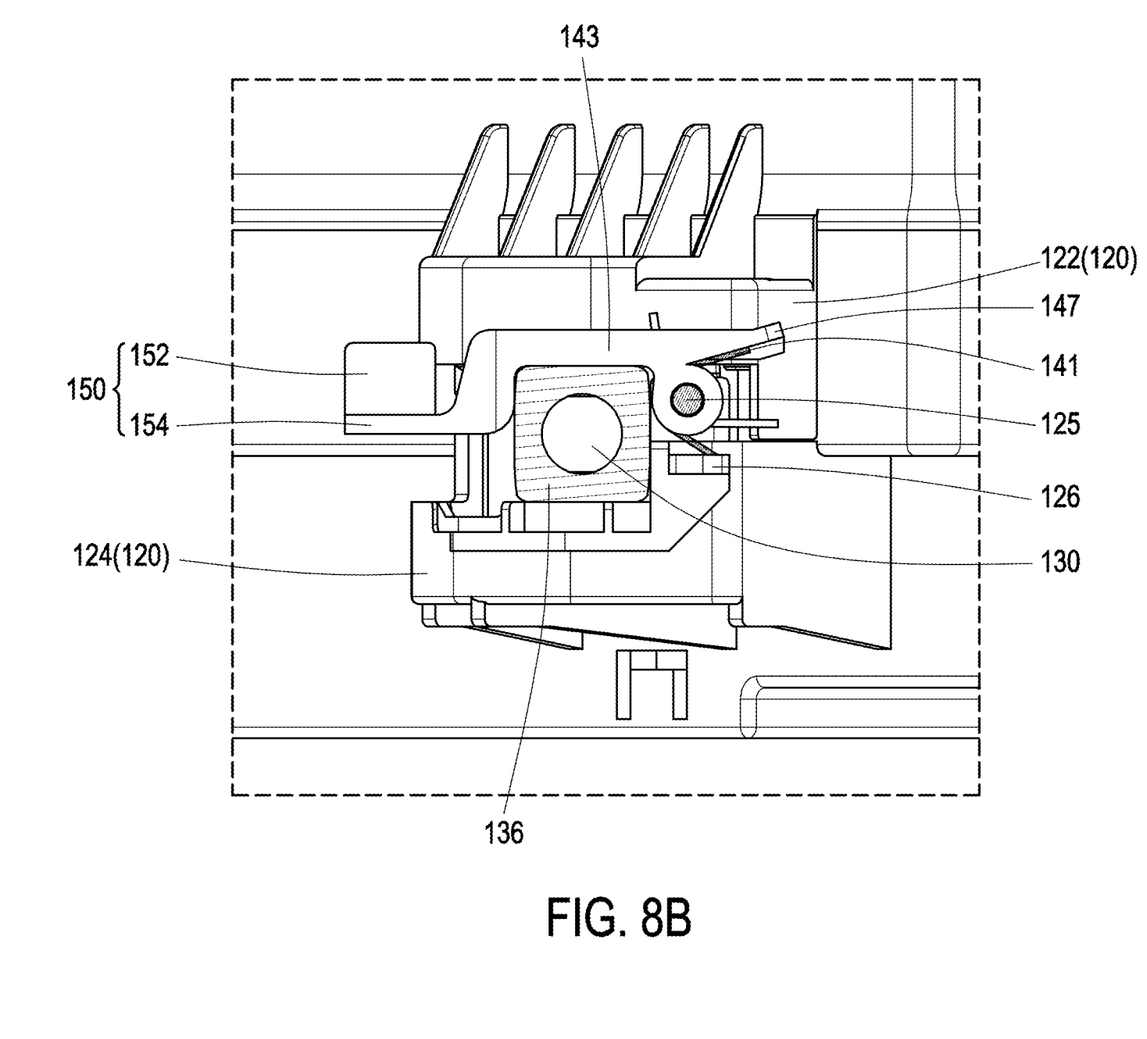
FIG. 8B is a schematic cross-sectional view of FIG. 8A.

FIG. 8A is a schematic three-dimensional view of the clamping member of the UAV in FIG. 1A clamping the arm. FIG. 8B is a schematic cross-sectional view of FIG. 8A. Referring to FIG. 3, FIG. 8A, and FIG. 8B, the arm 130 includes a positioning block 136. An outer contour of the positioning block 136 corresponds to the inner surface 144 (the inverted U shape) of the hook part 143. When the arm 130 is unfolded from the body 110, the hook part 143 releases the elastic force by the torsion spring 141 and rotates to return its original position. The hook part 143 clamps the positioning block 136 of the arm 130 along the radial direction of the arm 130 so as to fix the arm 130. As shown in FIG. 8B, at this time, a part of the arm 130 (that is, the positioning block 136) is located in the inverted U shape and well fixed by the lower shaft base 124 and the hook part 143 in up and down directions and is also well fixed by the hook part 143 in left and right directions.

Of course, in other embodiments, the positioning block 136 may also be omitted, and the hook part 143 may also directly clamp the cylindrical arm 130, but a shape of the arm 130 is not limited thereto. In one embodiment, a shape of the inner surface 144 of the hook part 143 may correspond to the outer contour of a portion of the arm 130 to be clamped.

To sum up, the arm of the UAV of the invention is pivotally disposed on the shaft base and may be movably close to the body or unfolded from the body. The clamping assembly is movably pivoted on the shaft base and surrounds the periphery of the shaft base. When the arm is close to the body, the arm is limited between the body and the clamping assembly by the clamping assembly so as to reduce the overall volume and avoid unnecessary collisions, so that the UAV is easy to carry and improves reliability. During the unfolding process of the arm, the clamping assembly is pushed by the arm to be pivotally rotated on the shaft base. When the arm is unfolded from the body, the clamping assembly clamps the arm along the radial direction of the arm by elastic force, so that the unfolded arm may be well fixed at a specific position of the shaft base, which improves a flight safety of the UAV and provides a good flight effect.

What is claimed is:

1. An unmanned aerial vehicle, comprising:
    a body;
    a shaft base, disposed outside the body;
    an arm, pivotally disposed on the shaft base and movably close to the body or unfolded from the body; and
    a clamping assembly, movably and pivotally disposed on the shaft base and surrounding a periphery of the shaft base;
    wherein when the arm is close to the body, the arm is limited between the body and the clamping assembly;
    wherein during an unfolding process of the arm, the clamping assembly is pushed by the arm so that the clamping assembly is pivotally rotated on the shaft base; and
    wherein when the arm is unfolded from the body, the clamping assembly clamps the arm along a radial direction of the arm by an elastic force generated by the clamping assembly,
    wherein the clamping assembly comprises a torsion spring and a clamping member, and the torsion spring is disposed between the clamping member and the shaft base and provides the elastic force generated by the clamping assembly,
    wherein the clamping member comprises a hook part and a limiting part integrally formed, and the hook part is located between the limiting part and the torsion spring, and when the arm is close to the body, the arm is limited between the body and the limiting part, and when the arm is unfolded from the body, the hook part clamps the arm along the radial direction of the arm by the elastic force generated by the clamping assembly.

2. The unmanned aerial vehicle according to claim 1, wherein the hook part comprises an inner surface facing the arm, the inner surface is in an inverted U shape, and when the arm is unfolded from the body, a part of the arm is located in the inverted U shape.

3. The unmanned aerial vehicle according to claim 2, wherein the hook part comprises an outer surface opposite to the inner surface and a reinforcing outer rib protruding from the outer surface.

4. The unmanned aerial vehicle according to claim 1, wherein the limiting part comprises a pushing section away from the hook part, the pushing section has an arc surface or an inclined surface, and during the unfolding process of the arm, the pushing section is pushed by the arm so that the clamping assembly is pivotally rotated on the shaft base, so that the arm passes through the pushing section.

5. The unmanned aerial vehicle according to claim 4, wherein the limiting part comprises a flat extension section connected between the pushing section and the hook part, the shaft base comprises a lower shaft base, and the pushing section is formed by the flat extension section extending in a direction away from the lower shaft base.

6. The unmanned aerial vehicle according to claim 1, wherein the shaft base comprises an upper shaft base and a lower shaft base, the arm is pivotably sandwiched between the upper shaft base and the lower shaft base by a shaft part, and a clamping member is movably and pivotally disposed on the upper shaft base or the lower shaft base and protrudes outside the shaft base.

7. The unmanned aerial vehicle according to claim 6, wherein each of the upper shaft base and the lower shaft base comprises a plurality of internal positioning ribs, at least part of the plurality of internal positioning ribs are arranged to extend radially with respect to a central axis of the shaft part and are disposed annularly outside the shaft part, and the plurality of internal positioning ribs abut against an outer surface of the shaft part.

8. The unmanned aerial vehicle according to claim 6, wherein the lower shaft base comprises a fixed shaft and a positioning part, the clamping assembly comprises a torsion spring and the clamping member, the clamping member comprises a hook part and a pressing part integrally formed, the clamping member and the torsion spring are both pivotally disposed on the fixed shaft, the fixed shaft is disposed close to an area between the hook part and the pressing part, and two ends of the torsion spring abut the pressing part and the positioning part and provide the elastic force.

\* \* \* \* \*